A. G. DENNLER.
INSULATOR.
APPLICATION FILED FEB. 23, 1909.
944,259.
Patented Dec. 28, 1909.
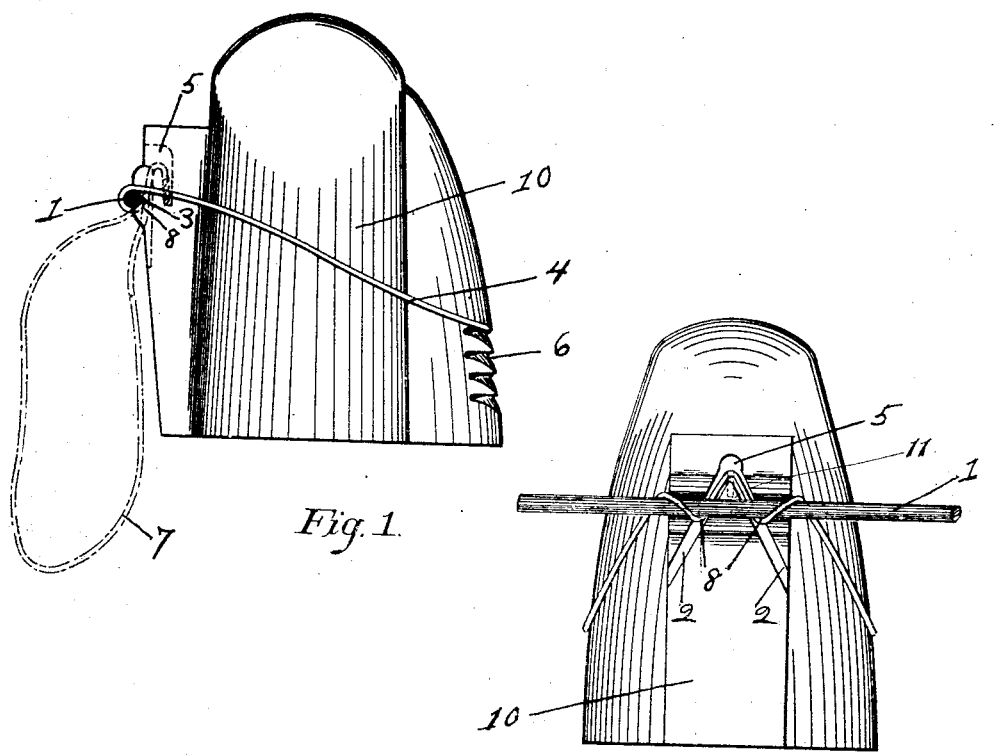
Fig. 1.
Fig. 2.
Fig. 3.
Witnesses.
W. F. Lakin.
Anna A. Bolger.
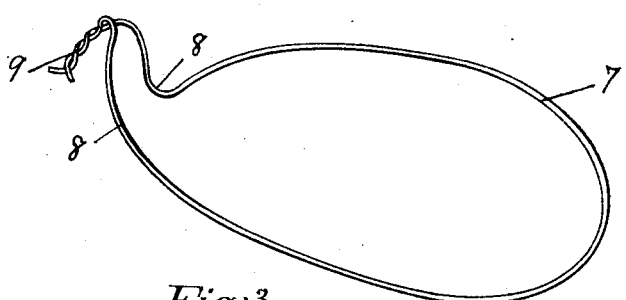
Inventor.
August G. Dennler
per
Ward & Jay.
Attorneys.

UNITED STATES PATENT OFFICE.

AUGUST G. DENNLER, OF EAST HAMPTON, CONNECTICUT, ASSIGNOR OF ONE-THIRD TO WILLIAM F. QUIGG, OF EAST HAMPTON, CONNECTICUT.

INSULATOR.

944,259.  Specification of Letters Patent.  Patented Dec. 28, 1909.

Application filed February 23, 1909. Serial No. 479,476.

*To all whom it may concern:*

Be it known that I, AUGUST G. DENNLER, a citizen of the United States, residing at East Hampton, in the county of Middlesex and State of Connecticut, have invented certain new and useful Improvements in Insulators, of which the following is a specification.

The object of my invention is to provide a device of the class specified which has features of novelty and advantage.

Figure 1 represents a side view of the insulator. Fig. 2 is an end view of the insulator showing the line wire fastened thereto. Fig. 3 shows the fastening wire.

The invention relates to a simple and rapid means for fastening a line wire. It relates to insulators and more particularly to those for outside work such as telegraph and telephone wires.

Referring now more particularly to the drawings: —10— represents the body of the insulator containing a hole —5— which extends inward and downward.

The fastening wire shown in Fig. 3 is an ordinary loop of wire made in any manner but preferably in the shape shown therein. It can be more conveniently used, if it is bent downward at the point —8— and also if the end —9— is bent downward. —1— represents a line wire which is to be fastened to the insulator.

In Fig. 2 are shown slots —2— which extend away from the hole —5—.

A groove —3— is shown in Fig. 1 which tends to retain the line wire in place.

The fastening wire —7— is inserted into the hole —5— and is then in the position of the dotted line —7— in Fig. 1. The line wire —1— which crosses above the loop —7— and rests upon it at —8— is then forced into the groove —3— forcing at the same time the fastening wire into the slots —2—. The fastening wire is then bent upward and over the top of the insulator encircling the same and is pressed down to the position marked —4— in Fig. 1, where it is fastened by any means such as the notches —6—.

In Fig. 2 the fastener is shown in place.

The loops —7— may be made in any number and carried about by a lineman. They are easy to make and convenient to carry.

My purpose is to produce a device simple and rapid to adjust and at the same time bound firmly so as to resist the action of the wind or weather.

I do not mean to limit myself to any detailed construction such as the exact shape or form of any of the elements or the materials of which they are composed. The purpose of the hole —5— is to prevent the end —9— of the fastening wire from working down inside the line wire and thus releasing it. The point or projection —11— would serve an analogous purpose without the hole. Similarly other means may be used for that object. The grooves —3— and the slots —2— may be changed in size, shape or direction or eliminated altogether.

Claims.

1. An insulator consisting of a body having a groove for a main line wire and converging slots intersecting said groove, means arranged in said slots for holding said main line securely in said groove.

2. An insulator consisting of a body having a groove for a main line wire and converging slots intersecting said groove, means for holding said main wire securely in said groove, said means consisting of a wire arranged in said converging slots and looped back over the body of the insulator.

3. An insulator consisting of a body having a groove for a main line wire and converging slots intersecting said groove, means for holding said main wire securely in said groove, said means consisting of a wire arranged in said converging slots and looped back over the body of the insulator, and means for securing said looped wire back in place.

4. An insulator consisting of a body having a groove for a main line wire and converging slots intersecting said groove and meeting a downwardly projecting hole in the body of the insulator, means for holding said main wire securely in said groove, said means consisting of a wire arranged in said hole and in said converging slots and looped back over the body of the insulator, and means for securing said looped wire back in place.

5. An insulator consisting of a body having a projection on one side thereof, a seat for said main line wire directly beneath said projection, and means for holding said main wire securely in said seat, said means consisting of a single piece of wire arranged under the main line wire and looped back over the body of the insulator and means for securing said looped wire in place.

6. An insulator consisting of a body having a projection on one side thereof, a seat for said main line wire directly beneath said projection, and means for holding said main wire securely in said seat, said means consisting of a wire overlying said projection and extending under said main line wire and looped back over said insulator means for holding said loop wire in place.

In testimony whereof I affix my signature in presence of two witnesses.

AUGUST G. DENNLER.

Witnesses:
   GEO. B. WARD,
   ANNA A. BOLGER.